(12) United States Patent
Ueno et al.

(10) Patent No.: US 7,982,330 B1
(45) Date of Patent: Jul. 19, 2011

(54) WIND TURBINE GENERATOR AND CABLE SUPPORTING STRUCTURE FOR USE THEREIN

(75) Inventors: Yasuhiro Ueno, Tokyo (JP); Yoshiaki Tsutsumi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/848,116

(22) Filed: Jul. 31, 2010

Related U.S. Application Data

(63) Continuation of application No. PCT/JP2010/054343, filed on Mar. 15, 2010.

(51) Int. Cl.
F03B 9/00 (2006.01)

(52) U.S. Cl. .......................................... 290/55; 290/44

(58) Field of Classification Search ................ 290/43, 290/44, 54, 55
See application file for complete search history.

(56) References Cited

U.S. PATENT DOCUMENTS

| | | | |
|---|---|---|---|
| 6,713,891 B2 | 3/2004 | Kirkegaard et al. | |
| 7,471,010 B1 * | 12/2008 | Fingersh | 290/55 |
| 7,656,055 B2 * | 2/2010 | Torres et al. | 290/55 |
| 2009/0206610 A1 * | 8/2009 | Martin et al. | 290/55 |

\* cited by examiner

*Primary Examiner* — Nicholas Ponomarenko
(74) *Attorney, Agent, or Firm* — Lowe Hauptman Ham & Berner LLP

(57) ABSTRACT

A wind turbine generator is provided with a tower, a nacelle mounted on the tower, a cable suspended downward from the nacelle through the tower, a length-variable mechanism having one end coupled to a specific position of the wind turbine generator, and a cable grip coupled to the other end of the length-variable mechanism. The distance between the specific position and the cable grip is adjustable by the length-variable mechanism. The cable grip includes a deformable tubular net and the cable is routed through the net.

8 Claims, 8 Drawing Sheets

Fig. 2
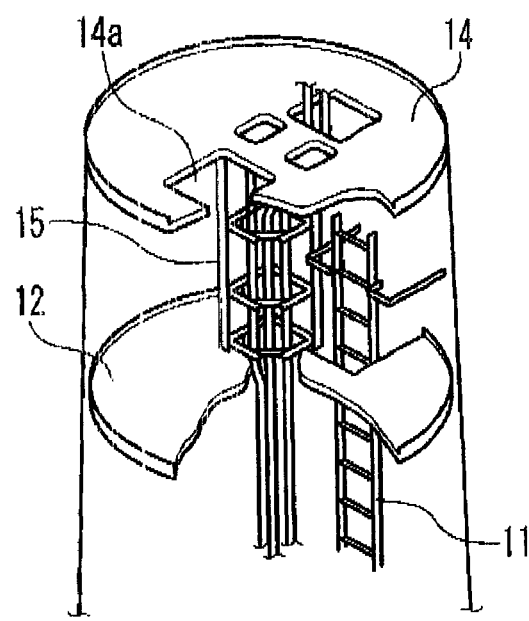
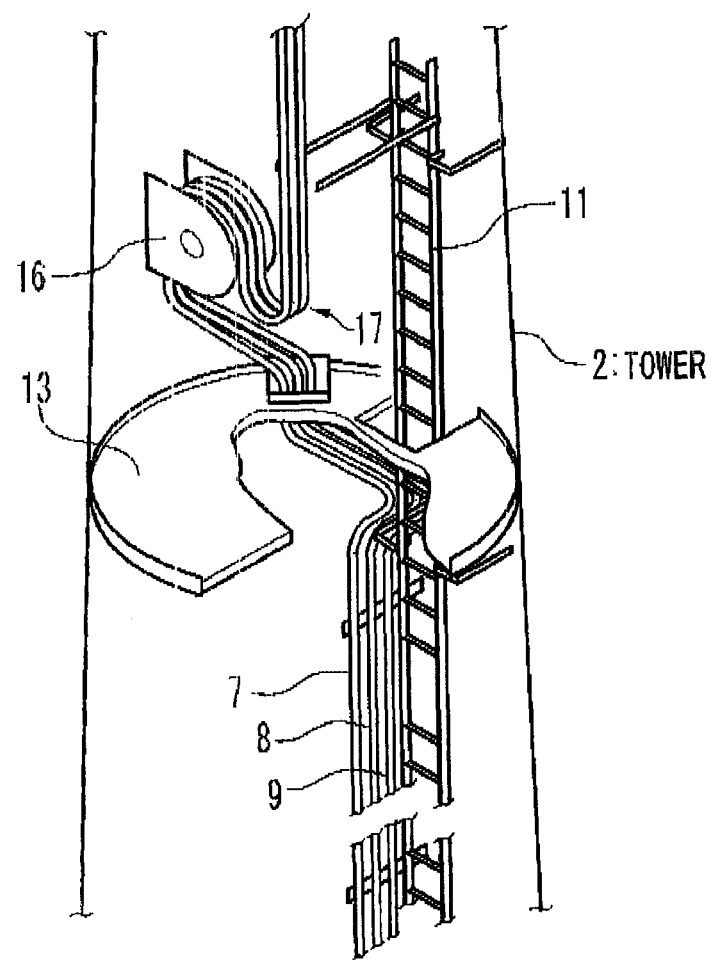

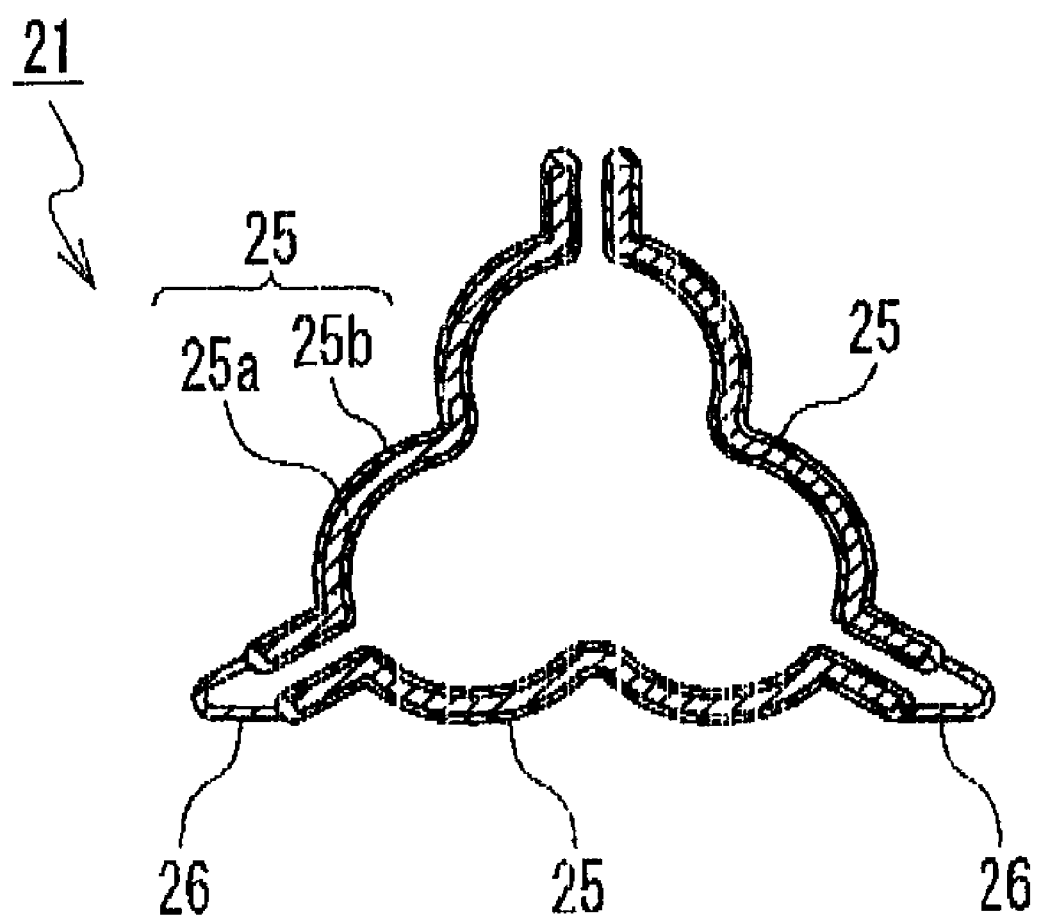

WIND TURBINE GENERATOR AND CABLE SUPPORTING STRUCTURE FOR USE THEREIN

CROSS-REFERENCE TO RELATED APPLICATION

This is a continuation of International Application No. PCT/JP2010/054343, filed on Mar. 15, 2010.

BACKGROUND OF THE INVENTION

1. Field of the Invention

The present invention generally relates to a wind turbine generator and a cable supporting structure for use therein, and more particularly to a cable supporting structure suitably used for holding a cable suspended from a nacelle of the wind turbine generator.

2. Description of the Related Art

A distinctive feature of the structure of the wind turbine generator is that major components constituting the wind turbine generator, such as a generator, a pitch control system and a yaw control system, are provided away from the ground. Specifically, a nacelle is provided on the top of a tower so that the nacelle is rotatable in the azimuth direction, and a generator, a gear box, a pitch control system and a yaw control system are installed in the nacelle.

Cables are suspended through the tower to connect the instruments installed in the nacelle with facilities provided on the ground (e.g., in-site power lines, a SCADA (Supervisory Control and Data Acquisition) and so on). The suspended cables include a power cable connected to the generator, and a control cable used to control the instruments installed in the nacelle. These cables are required to be securely fixed to stand vibrations caused by operations of the wind turbine generator.

One most typical method for fixing a cable to be suspended is to clamp the cable between a first plate which is fixed to the tower and a second plate which is opposed to the first plate, and to fasten the first and second plates with a bolt. U.S. Pat. No. 6,713,891 discloses such a structure.

One difficulty in fixing a cable is that the weight of the cable tends to be increased in a large-scaled wind turbine generator as developed recently. In a recent wind turbine generator, it is necessary to increase the diameter of the cable as the power output is increased, since a large current is required to flow through the cable. In addition, the height of the tower also tends to be increased in the recent wind turbine generator. Due to these two factors, the weight of the cable tends to be increased. In order, to address the increase in the weight of the cable, there also arises a requirement of increasing the fixing force of the cable. However, according to a study by the inventors, the cable may be insufficiently supported by a structure in which the cable is fastened with plates and a bolt.

SUMMARY OF THE INVENTION

Therefore, an objective of the present invention is to provide a cable supporting structure suitable for suspending a heavy cable.

In one aspect of the present invention, a wind turbine generator is provided with a tower, a nacelle mounted on the tower, a cable suspended downward from the nacelle through the tower, a length-variable mechanism having one end coupled to a specific position of the wind turbine generator, and a cable grip coupled to the other end of the length-variable mechanism. The distance between the specific position and the cable grip is adjustable by the length-variable mechanism. The cable grip includes a deformable tubular net and the cable is routed through the inside of the net.

Preferably, the distance between the specific position and the cable grip is adjusted by the length-variable mechanism so that the cable is slightly slack between the cable grip and the specific position.

In one embodiment, the length-variable mechanism includes a turn buckle.

When the wind turbine generator further includes an additional cable supporting structure for supporting the cable, it is preferable that the one end of the length-variable mechanism is coupled to the cable supporting structure. In one embodiment, the cable supporting structure has a shape corresponding to the cable and includes: a mat attached to the cable to surround the cable; and a bolt which presses the mat against a structure member of the wind turbine generator. In one embodiment, the structure member is an access ladder attached to a lower frame of the nacelle.

In another aspect or the present invention, a cable supporting structure for supporting a cable includes a length-variable mechanism having one end coupled to a specific position, and a cable grip coupled to the other end of the length-variable mechanism. The distance between the specific position and the cable grip is adjustable by the length-variable mechanism. The cable grip includes a deformable tubular net and the cable is routed through the net.

The present invention, the cable supporting structure suitable for suspending a heavy cable is provided.

BRIEF DESCRIPTION OF DRAWINGS

FIG. 2 is a perspective view showing the inner structure of the tower in one embodiment;

FIG. 5C is a sectional view showing the structure of a UB mat of the UB mat structure shown in FIG. 5A;

EMBODIMENTS OF INVENTION

Figure 1:
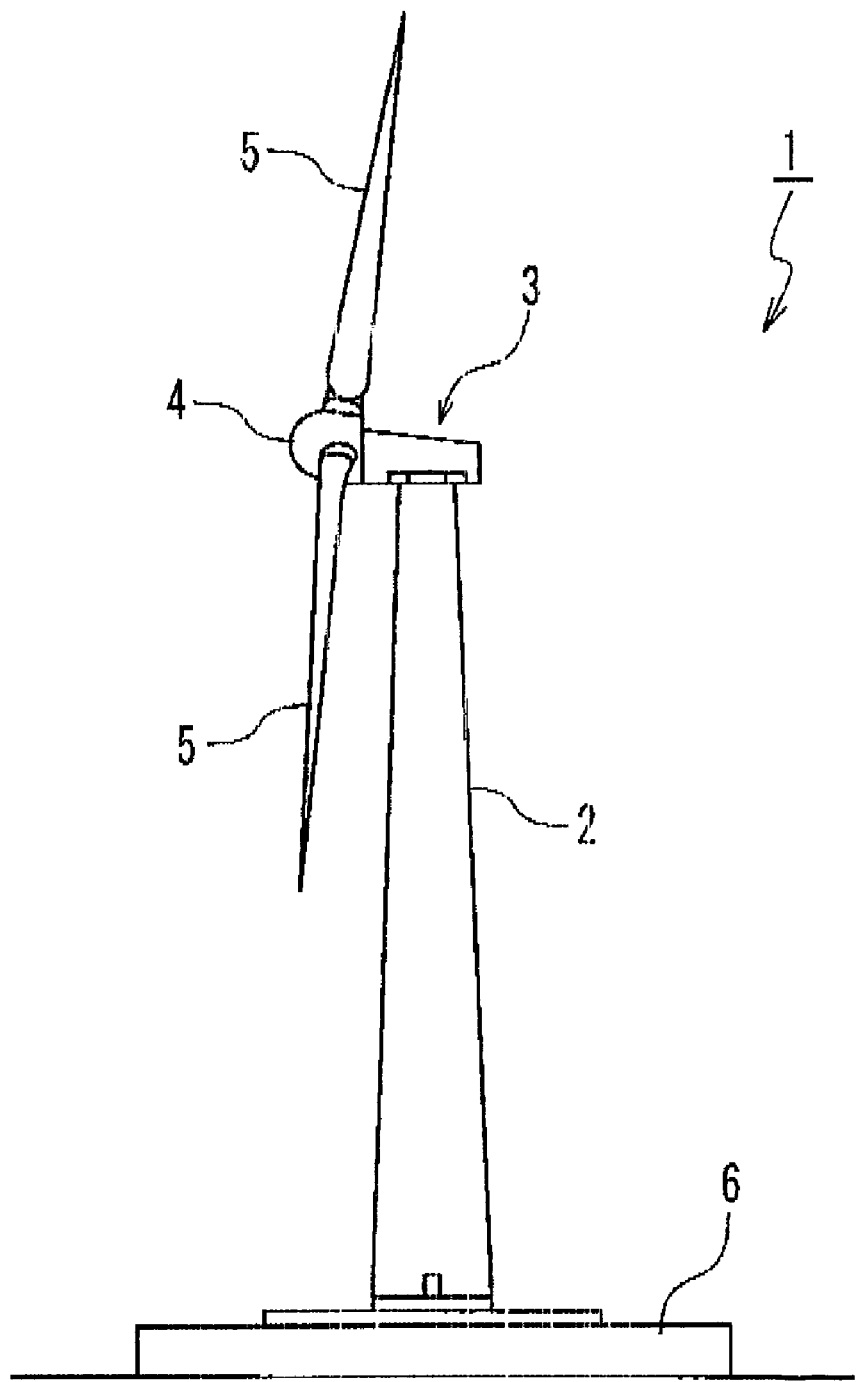
FIG. 1 is a side view showing the configuration of a wind turbine generator in one embodiment of the present invention.

FIG. 1 is a side view showing the configuration of a wind turbine generator 1 in one embodiment of the present invention. The wind turbine generator 1 includes a tower 2 stood on a foundation 6, a nacelle 3 disposed on the top of the tower 2, a rotor head 4 rotatably attached to the nacelle 3, and a wind turbine blade 5 attached to the rotor head 4. The rotor head 4 and the wind turbine blade 5A form a wind turbine rotor. When the wind turbine rotor is rotated by wind power, the wind turbine generator 1 generates electric power and supplies the power to the utility grid connected with the wind turbine generator 1.

FIG. 2 is a perspective view showing the inner structure of the tower 2. In this embodiment, cables 7, 8 and 9 are suspended from the nacelle 3. Main issues of this embodiment are a structure for supporting the cables 7, 8 and 9. In the following, a detailed description is given of a structure provided inside the tower 2 and the structure for supporting the cables 7, 8 and 9.

A ladder 11 is vertically attached to the internal surface of the tower 2, and upper and lower landings 12 and 13 are further provided. The upper landing 12 and the lower landing 13 are each provided with an opening through which the ladder 11 is passed. A worker can climb the ladder 11 and reach the upper landing 12.

A lower frame 14 of the nacelle 3 is provided with an opening 14a for a worker to get in and out therethrough and, in the proximity thereof, an access ladder 15 is attached to the lower surface of the lower frame 14. The access ladder 15 is attached so as to include the rotation axis of the nacelle 3 and to extend vertically. A worker can enter the nacelle 3 by climbing the access ladder 15 from the upper landing 12. In this embodiment, the cables 7, 8 and 9 are routed through the access ladder 15 and attached to the access ladder 15 to be suspended therefrom. That is, the access ladder 15 also functions as a cable guide for guiding the cables 7, 8 and 9. Structures for attaching the cables 7, 8 and 9 to the access ladder 15 are described later. The cables 7, 8 and 9 are extended downward from the access ladder 15 and routed through the opening formed through the upper landing 12.

A cable drum 16 is attached to a position between the upper landing 12 and the lower landing 13 on the inner face of the tower 2. The cables 7, 8 and 9 suspended from the access ladder 15 are routed along the upper surface of the cable drum 16 and further guided downward the cable drum 16. The cable drum 16 has a function of providing a downward curve 17 for the cables 7, 8 and 9 suspended from the access ladder 15. The formation of the downward curve 17 is useful for allowing the twist of the cables 7, 8 and 9 when the nacelle 3 is rotated. Even when the cables 7, 8 and 9 are twisted by the rotation of the nacelle 3, the twist is absorbed by the downward curve 17; the cables 7, 8 and 9 are not displaced below the cable drum 16 even when the nacelle 3 is rotated. This effectively facilitates the connection of the cables 7, 8 and 9 to the facilities built on the ground.

Figure 3:
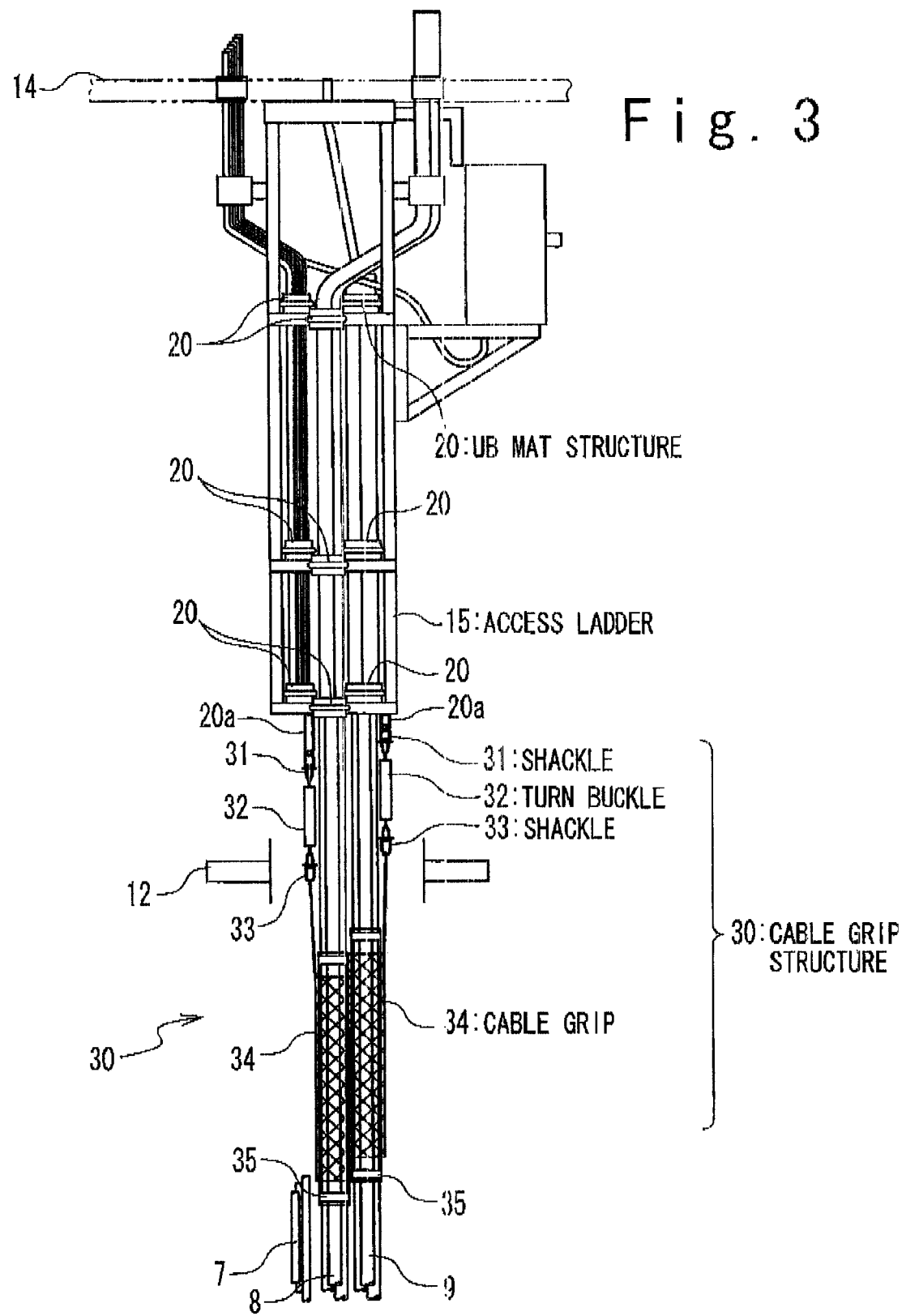
FIG. 3 is a side view showing the structure for attaching a cable to an access ladder in one embodiment.

FIG. 3 shows a structure for attaching the cables 7, 8 and 9 to the access ladder 15 in this embodiment. In this embodiment, two kinds of structures are used for supporting each of the cables 7, 8 and 9. One is a UB mat structure and the other is a cable grip structure. Each of the cables 7, 8 and 9 is attached to the access ladder 15 by three UB mat structures 20. In addition, each of the cables 8 and 9, which have a weight larger than that of the cable 7, is suspended by a cable grip structure 30. In the following, a description is given of the UB mat structures 20 and the cable grip structures 30.

Figure 4:
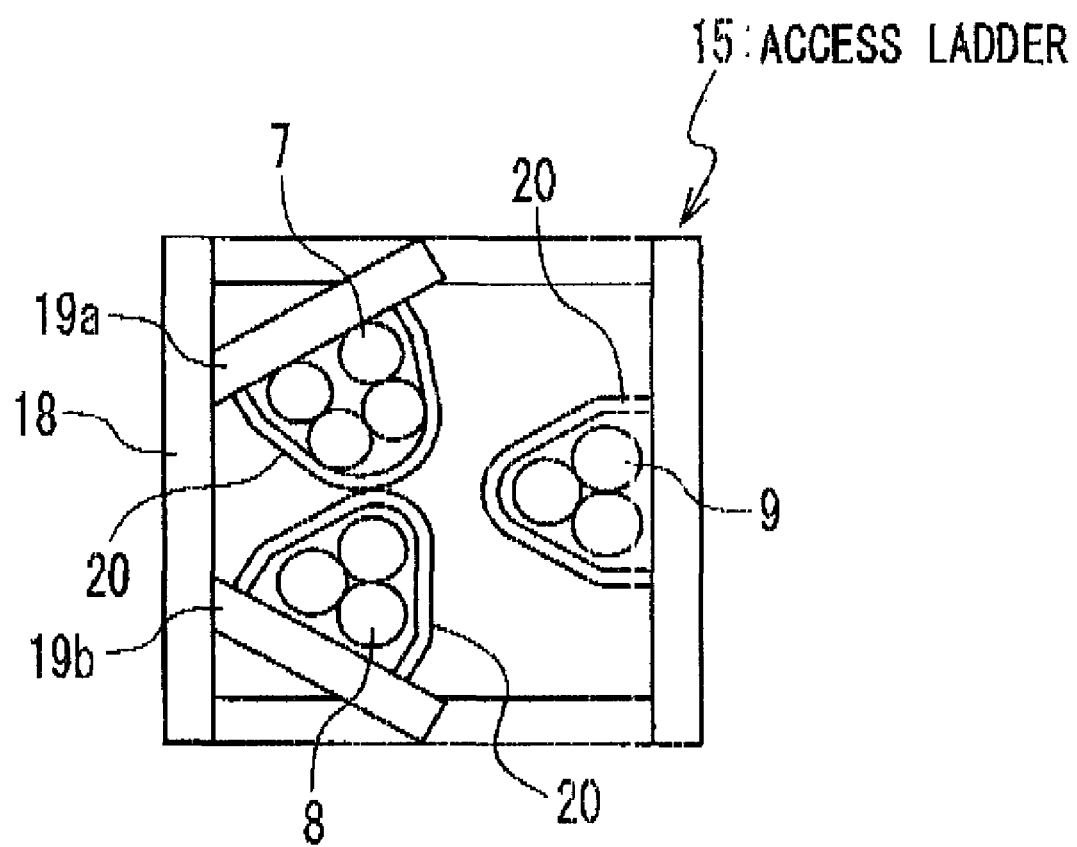
FIG. 4 is a diagram showing the structure for attaching a cable to an access ladder in one embodiment.

FIG. 4 is a top plan view of a portion where the cables 7, 8 and 9 are attached to the access ladder 15 by the UB mat structures 20. The access ladder 15 has a rectangular frame 18 on which beams 19a and 19b are provided as to bridge between two bars of the frame 18. The cables 7, 8 and 9 are attached to the beams 19a, 19b and the frame 18 by the UB mat structures 20, respectively.

Figure 5A:
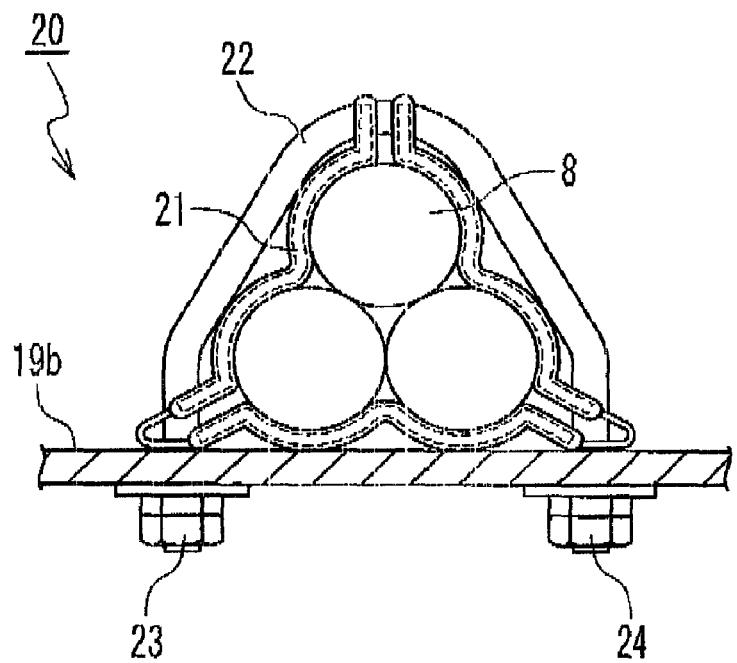
FIG. 5A is a top plan view showing a UB mat structure in one embodiment.
Figure 5B:
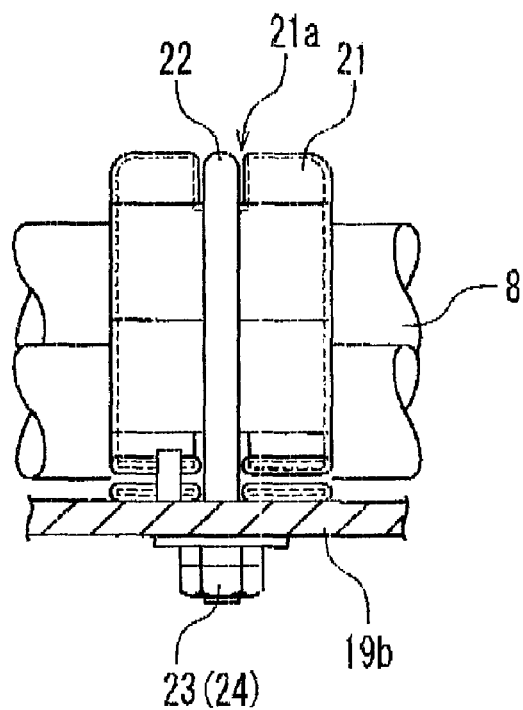
FIG. 5B is a side view showing the UB mat structure shown in FIG. 5A.

FIG. 5A is a top plan view of the UB mat structures 20, and FIG. 5B is a side view of the UB mat structures 20. It should be noted that, although FIGS. 5A and 5B show the structure of the UB mat structure 20 for attaching the cable 8 to the beam 19b of the access ladder 15, the other UB mat structures 20 also have the same structures.

Referring to FIG. 5A, the UB mat structure 20 includes a UB mat 21, a bolt 22 and nuts 23 and 24. The UB mat 21 includes three grasping members 25 and coupling members 26 for coupling the grasping members 25 as shown in FIG. 5C. Each of the grasping members 25 includes a core plate 25a formed of a metal and a resin layer 25b covering the surface of the core plate 25a. For example, stainless steel (e.g., SUS 304) may used as the core plates 25a, and polyvinyl chloride may be used as the resin layers 25b. The resin layers 25b prevent damages of the coverings of the cables 7, 8 and 9 and contribute to increase of the friction acting between the cables 7, 8 and 9 and the UB mats 21. In addition, as shown in FIG. 5B, the UB mats 21 are each provided with a slot 21a for receiving the bolt 22. The slot 21a has a function of preventing the bolt 22 from displacing in the axial direction of the cables 7, 8 and 9.

Referring to FIGS. 5A and 5B, when the nuts 23 and 24 are tightened to both ends of the bolt 22 with the cable 7, 8 or 9 enclosed with the UB mat 21, the cable 7, 8 or 9 enclosed with the UB mat 21 is pressed to the beam 19b of the access ladder 15 by the bolts 22. The cable 7, 8 or 9 is thereby secured to the beam 19b. The UB mat 21 has concaves and convexes along the peripheral surface of the bundled cable 7, 8 or 9 and the elastic resin layers 25b are abutted to the cable 7, 8 or 9 so that the cable 7, 8 or 9 are securely fixed. In addition, the slot 21a provided for the UB mat 21 prevents displacement of the bolt 22 and contributes to secure fixation of the cable 7, 8 or 9.

It is preferable to use so-called "hard lock nuts" as the nuts 23 and 24. The hard lock nut is a nut assembly including an upper nut with a recess and a lower nut with a protrusion fitted to the recess. The hard lock nut is disclosed in, for example, U.S. Pat. No. 6,609,867.

There may be a case where the UB mat structures which fix the cables by the bolts 22 as described above, cannot successfully support the cables when the weights of the cables are increased. In this embodiment, the cable grip structures 30 are therefore used for supporting the cables 8 and 9, which have a large weight, as described below.

Figure 6:
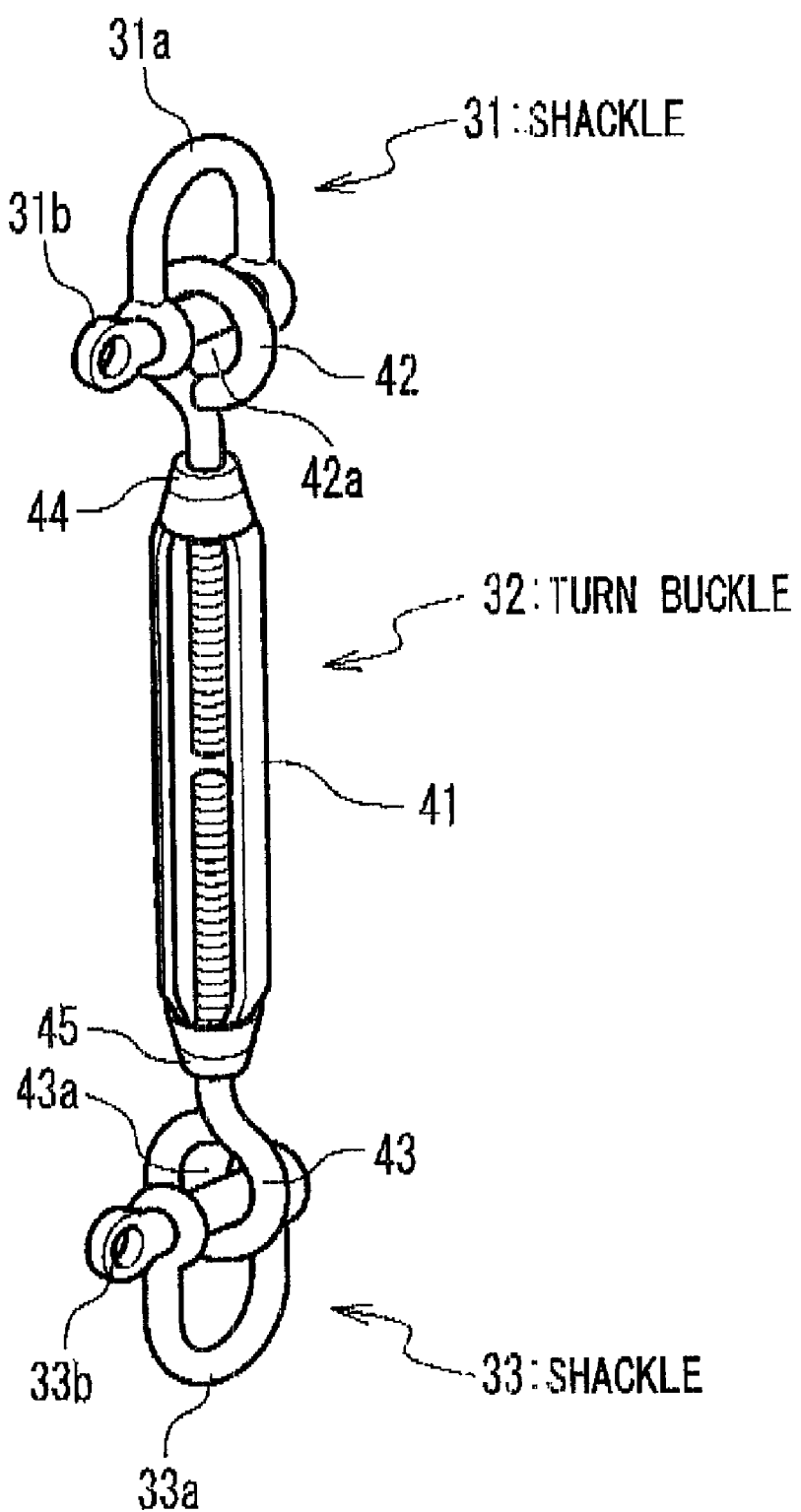
FIG. 6 is a perspective view showing the structure of shackles and a turn buckle used in a cable grip structure in one embodiment.

Referring back to FIG. 3, the cable grip structures 30 each include a pair of shackles 31 and 33, a turn buckle 32 and a cable grip 34. FIG. 6 is a perspective view showing the configuration of the shackles 31 and 33 and the turn buckle 32. The shackle 31 includes a U-shaped main body 31a and a pin 31b. Similarly, the shackle 33 includes a U-shaped main body 33a and a pin 33b. The shackle 31 is coupled to a suspending wire 20a, and the shackle 33 is coupled to the cable grip 34. In this embodiment, the suspending wire 20a is coupled to the bolt 22 of the UB mat structure 20 attached to the access ladder 15. It should be noted, however, that the suspending wire 20a may be coupled to any structural member of the wind turbine generator 1.

The turn buckle 32 includes a barrel part 41, a pair of eye bolts 42 and 43, and a pair of nuts 44 and 45. Two female threads are formed at both ends of the barrel part 41 so that the eye bolts 42 and 43 are screwed to the female threads. Further, the nuts 44 and 45 are inserted to the eye bolts 42 and 43, respectively. The nuts 44 and 45 are used for fixing the positions of the eye bolts 42 and 43. After the positions of the eye bolts 42 and 43 are adjusted to desired positions, the nuts 44 and 45 are tightened so that the eye bolts 42 and 43 are fixed to the desired positions. The hard lock nuts mentioned above may be used as the nuts 44 and 45. The eye bolts 42 and 43 include loops 42a and 43a, respectively. The pins 31b and 33b of the shackles 31 and 33 are inserted through the loops 42a and 43a, respectively, so that the shackles 31 and 33 are coupled to both ends of the turn buckle 32.

The turn buckle 32 having the configuration mentioned above is used to adjust the distance between the attachment position of the cable grip structure 30 (i.e., the access ladder 15 or the UB mat structure 20 in this embodiment) and the cable grip 34. When the eye bolts 42 and 43 are rotated, the distance between the loops 42a and 43a, i.e., the distance between the attachment position of the cable grip structure 30 and the cable grip 34 is varied. Thus, the distance between the attachment position of the cable grip structure 30 and the cable grip 34 can be adjusted to a desired distance.

Figure 7:
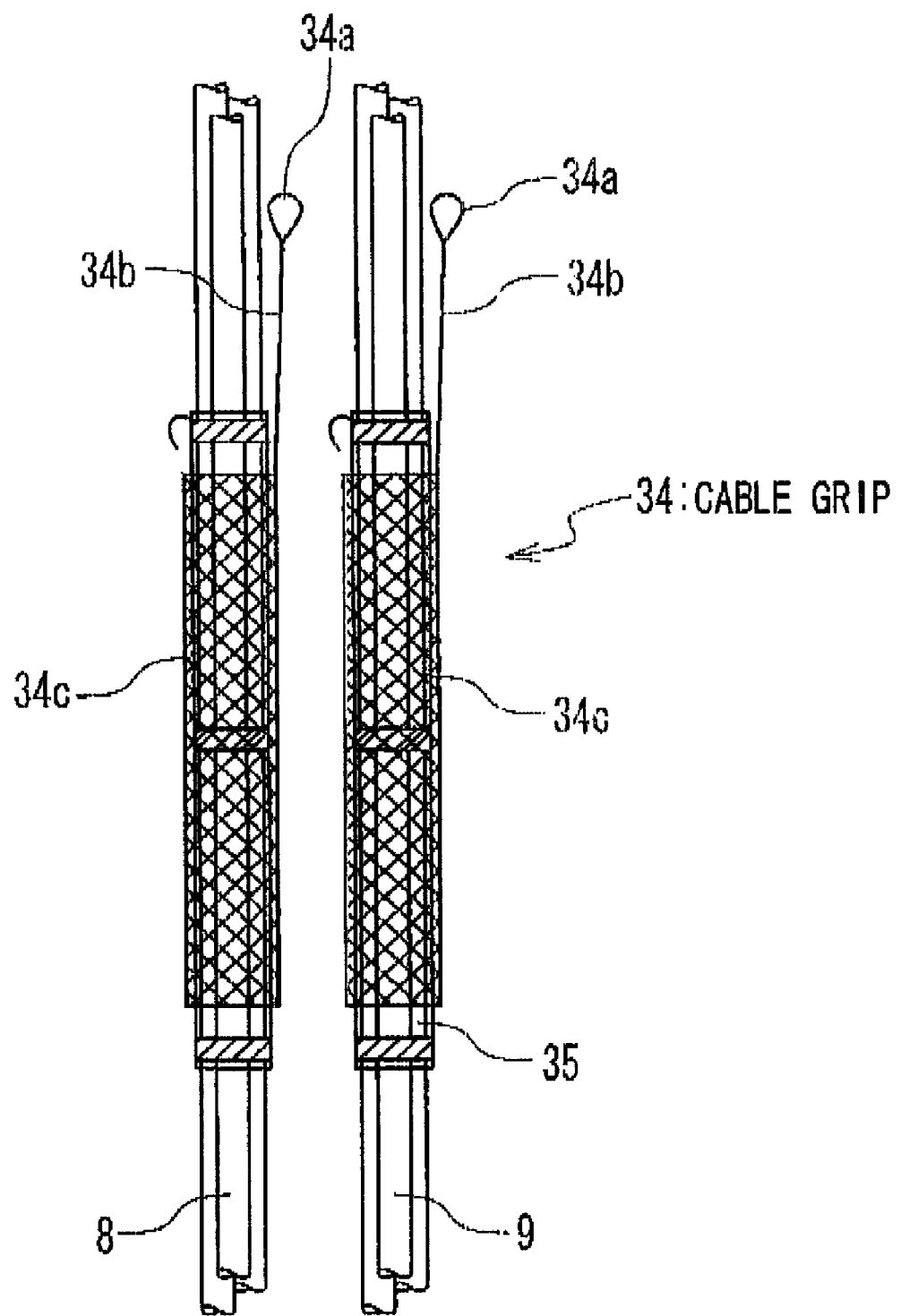
FIG. 7 is a side view showing the structure of a cable grip in one embodiment.

On the other hand, FIG. 7 is a side view showing the structure of the cable grip 34. The cable grip 34 includes a loop 34a, a coupling wire 34b and a net 34c. The loop 34a is coupled to the net 34c by the coupling wire 34b. The net 34c has flexibility and has a function of holding the cable 8 or 9 routed through the net 34c. In order to prevent the cables 8 and 9 from being damaged, it is preferable to wrap a rubber band 35 formed of elastic material around each of the cables 8 and 9. The rubber band 35 is provided between the net 34c and each of the cables 8 and 9 to effectively prevent the cables 8 and 9 from being damaged.

The cable grip structure 30 constructed as mentioned above suspends and hold each of the cable 8 or 9 as described below. Referring to FIG. 3, the net 34c is belt-shaped in the original state, in which the net 34c is no attached to the cable 8 or 9. The net 34c is wrapped around the cable 8 or 9 with the net 34c opened, and the seam of the net 34c is seamed by a wire. This makes the net 34c tubular so that the cable 8 or 9 is enclosed by the net 34c. Further, the shackle 31 is suspended to the bolt 22 of the UB mat structure 20 by the suspending wire 20a, and the loop 34a of the cable grip 34 is suspended to the shackle 33 in a state in which the cable 8 or 9 is routed through the net 34c. Here, when the gravity works on the cable 8 or 9 in a state in which the cable 8 or 9 is routed through the net 34c, the net 34c is extended in the axial direction of the cable 8 or 9 by the friction acting between the net 34c and the cable 8 or 9 so that the diameter of the net 34c is reduced. Thus, the net 34c holds the cable 8 or 9.

In order to apply the weight of the cable 8 or 9 to the net 34c of the cable grip 34, it is effective that the cable 8 or 9 is slightly slack in the upper portion than the cable grip 34. In this embodiment, a minute slack is provided for the cable 8 and 9 by adjusting the distance between the cable grip 34 and the suspending position (the access ladder 15 in this embodiment) by the turn buckle 32. This allows fully applying the weight of the cable 8 and 9 to the net 34c to provide an effective holding force for the cable 8 or 9.

One advantage of the cable grip structure 30 constructed as described above is that the force which extends the net 34c in the axial direction becomes strong as the weight of each of the cable 8 or 9 increases, and therefore the force holding the cable 8 or 9 by the net 34c becomes strong as well. The cable grip structure 30 of this embodiment having such characteristics is suitable for holding the cable 8 or 9 having a large weight.

Another advantage of the cable grip structure 30 is that it is easy to use in combination with another cable supporting structure, since the structure has a shape elongated along the cable. In this embodiment, the UB mat structure 20 and the cable grip structure 30 are used in combination in order to attach each of the cables 8 and 9 to the access ladder 15. This enables hold the cables 8 and 9 more securely. Here, the fact that the shackle 31 of the cable grip structure 30 is coupled to the UB mat structure 20 by the suspending wire 20a contributes to the reduction in the space of the structure for supporting the cables 8 and 9.

Although embodiments of the present invention are described above in detail, the present invention should not be interpreted as being limited to the above-described embodiments, and it would be apparent to those skilled in the art that various changes or modifications may be allowed in the present invention. For example, although the UB mat structures 20 and the cable grip structures 30 are used for attaching the cables 7, 8 and 9 to the access ladder 15 in the embodiments described above, the UB mat structures 20 and the cable grip structures 30 may be used for supporting the cables 7, 8 and 9 at various positions. For example, UB mat structures 20 and cable grip structures 30 may be used for supporting the cables 7, 8 and 9 in positions below the cable drum 16.

What is claimed is:

1. A wind turbine generator, comprising:
   a tower;
   a nacelle mounted on said tower;
   a cable suspended downward from said nacelle through said tower;
   a length-variable mechanism having one end coupled to a specific position of said wind turbine generator; and
   a cable grip coupled to the other end of said length-variable mechanism,
   wherein a distance between said specific position and said cable grip is adjustable by said length-variable mechanism,
   wherein said cable grip includes a deformable tubular net, and
   wherein said cable is routed through said net.

2. The wind turbine generator according to claim 1, wherein the distance between said specific position and said cable grip is adjusted so that the cable is slack between said cable grip and said specific position.

3. The wind turbine generator according to claim 1, wherein said length-variable mechanism includes a turn buckle.

4. The wind turbine generator according to claim 1, further comprising: an additional cable supporting structure for supporting said cable,
   wherein said one and of the length-variable mechanism is coupled to said cable supporting structure.

5. The wind turbine generator according to claim 4, wherein said cable supporting structure includes:
   a mat having a shape corresponding to said cable and attached to said cable to surround said cable; and
   a bolt which presses said mat against a structure member of said wind turbine generator.

6. The wind turbine generator according to claim 5, wherein said structure member is an access ladder attached to a lower frame of the nacelle.

7. A wind turbine generator cable supporting structure for supporting a cable, comprising:
   a tower;
   a nacelle mounted on said tower for suspending the cable downward from said nacelle through said tower;
   a length-variable mechanism having one end to be coupled to a specific position; and
   a cable grip coupled to the other end of said length-variable mechanism,
   wherein a distance between said specific position and said cable grip is adjustable by said length-variable mechanism,
   wherein said cable grip includes a deformable tubular net, and
   wherein said cable is routed through said net.

8. The cable supporting structure according to claim 7, wherein said length-variable mechanism includes a turn buckle.

* * * * *